(12) United States Patent
Igoe et al.

(10) Patent No.: US 9,094,651 B2
(45) Date of Patent: Jul. 28, 2015

(54) METHOD AND APPARATUS FOR UNIFIED SWITCHING OF DIGITAL OR ANALOG VIDEO AND AUDIO USING AN ANALOG VIDEO SWITCHING DEVICE

(76) Inventors: Joseph M. Igoe, Los Angeles, CA (US); Patrick T. Igoe, Philadelphia, PA (US)

(*) Notice: Subject to any disclaimer, the term of this patent is extended or adjusted under 35 U.S.C. 154(b) by 2162 days.

(21) Appl. No.: 11/247,633

(22) Filed: Oct. 11, 2005

(65) Prior Publication Data

US 2006/0078286 A1      Apr. 13, 2006

Related U.S. Application Data

(60) Provisional application No. 60/618,006, filed on Oct. 12, 2004.

(51) Int. Cl.
*H04N 5/765* (2006.01)
*H04N 5/775* (2006.01)

(52) U.S. Cl.
CPC ............... *H04N 5/765* (2013.01); *H04N 5/775* (2013.01)

(58) Field of Classification Search
CPC ............................... H04N 5/765; H04N 5/775

USPC .............................................. 386/95, 80, 116
See application file for complete search history.

(56) References Cited

U.S. PATENT DOCUMENTS

| | | | | |
|---|---|---|---|---|
| 4,885,632 | A | * | 12/1989 | Mabey et al. ................... 725/20 |
| 6,493,034 | B1 | * | 12/2002 | Elberbaum ................... 348/512 |
| 2004/0261112 | A1 | * | 12/2004 | Hicks et al. ..................... 725/89 |

* cited by examiner

*Primary Examiner* — Tat Chio
(74) *Attorney, Agent, or Firm* — Igoe Intellectual Property, LLC; Patrick T. Igoe

(57) ABSTRACT

A system and method are described for using the video switching capabilities of a first video switching device to select one of a plurality of distinguishable probe signals. The selected probe signal is detected and a corresponding control signal for a second video switching device is generated. In one embodiment of the present invention, the analog video switching capabilities of an audio-video receiver are used to select one of the probe signals. Said embodiment then detects which probe signal was passed, generates an appropriate control signal, and transmits it to a device capable of switching both analog and digital video, like a digital television or a DVI-or HDMI-capable switcher.

12 Claims, 5 Drawing Sheets

METHOD AND APPARATUS FOR UNIFIED SWITCHING OF DIGITAL OR ANALOG VIDEO AND AUDIO USING AN ANALOG VIDEO SWITCHING DEVICE

CROSS-REFERENCE TO RELATED APPLICATIONS

This application claims the benefit of U.S. Provisional Patent Application No. 60/618,006 filed Oct. 12, 2004, and entitled "Method and Apparatus for Unified Switching of Digital or Analog Video and Audio using an Analog Video Switching Device" the entire disclosure of which is herein incorporated by reference.

BACKGROUND OF THE INVENTION

The transition to digital video and audio has cause a regression in the convenience of home theater systems. For composite video or S-Video, integrated audio-video receivers are readily available that will switch both audio and video signals. A single button press on a remote control selects an audio signal and the corresponding video signal.

With the advent of digital television, and component, DVI and HDMI video connections, present mainstream consumer receivers are generally no longer capable of providing this level of convenience. As a workaround, audio switching is performed using the receiver and video switching is performed using the television. This procedure is cumbersome for the user, generally requiring the use of two different remote controls and in many cases, trial-and-error.

While home theater receiver feature sets will undoubtedly advance to allow switching of many digital and analog video sources, a solution is required to allow such switching in systems using receivers only capable of switching analog video, or analog video and a limited number of digital video sources.

SUMMARY OF THE INVENTION

A system and method are described for using the video switching capabilities of a first video switching device to select one of a plurality of distinguishable probe signals. The selected probe signal is detected and a corresponding control signal for a second video switching device is generated. In one embodiment of the present invention, the analog video switching capabilities of an audio-video receiver are used to select one of the probe signals. Said embodiment then detects which probe signal was passed, generates an appropriate control signal, and transmits it to a device capable of switching both analog and digital video, like a digital television or a DVI- or HDMI-capable switcher.

BRIEF DESCRIPTION OF THE DRAWINGS

The accompanying drawings, which are incorporated in and form a part of the specification, illustrate embodiments of the present invention and, together with the description serve to explain the principles of the invention.

DETAILED DESCRIPTION OF PREFERRED EMBODIMENTS OF THE INVENTION

Figure 1:
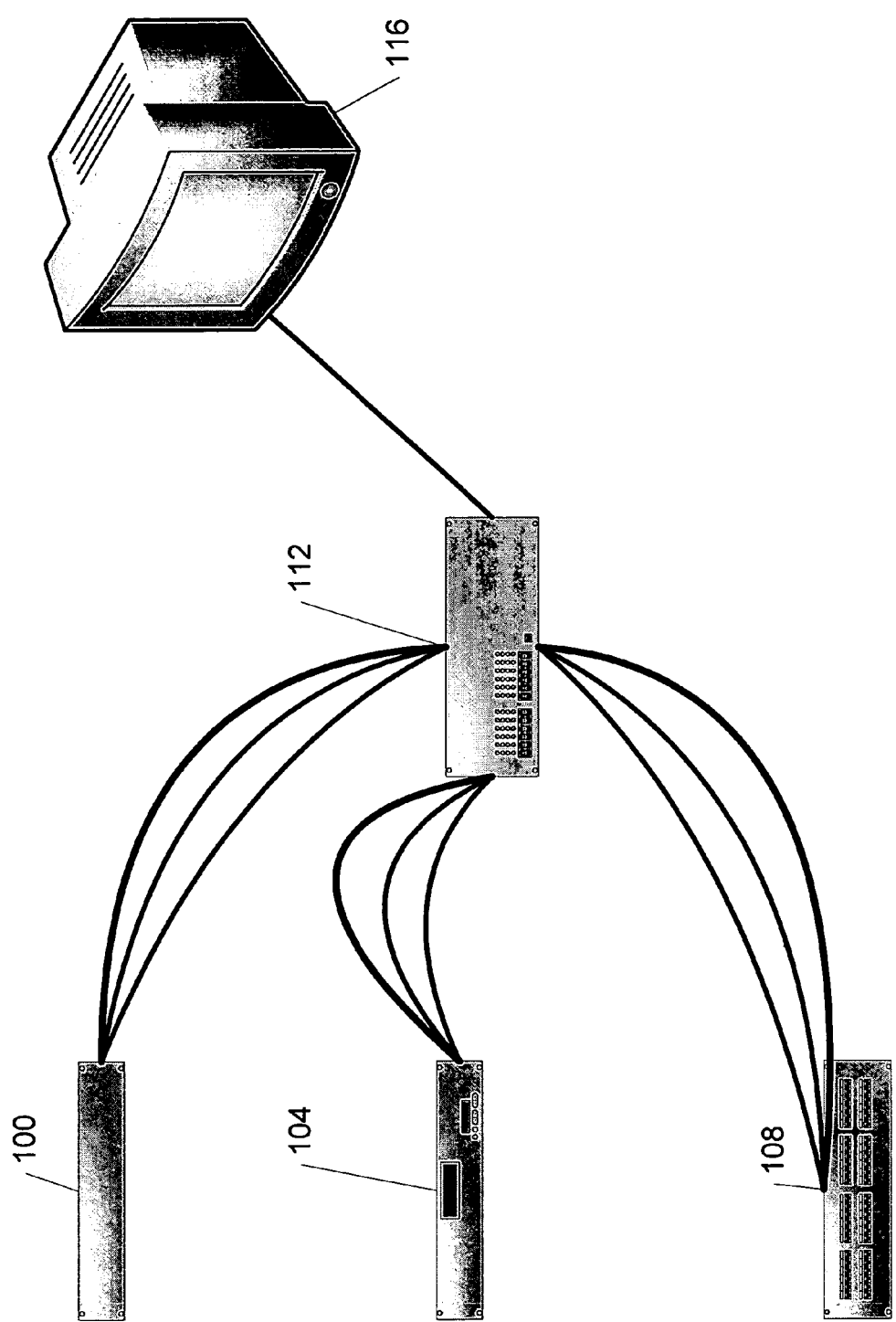
FIG. 1 illustrates a prior art home theater system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The many features and advantages of the invention are apparent from the detailed specification. Thus, the appended claims are intended to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention.

Existing Technology

FIG. 1 shows a prior art home audio/video system. Components like set-top boxes 100, DVD players 104, and DVD or CD changers send audio and video signals to a home theater receiver 112. The user selects one of the inputs, or an internal function of the receiver like an FM tuner. The receiver then passes the selected audio signal related to the selected source through its amplifier and to loud speakers (not shown), and passes the video signal corresponding to the selected source to a television or monitor 116. A system of this nature provides a high level of convenience. A single button push on a remote control can select both the audio and video related to the desired source.

Figure 2:
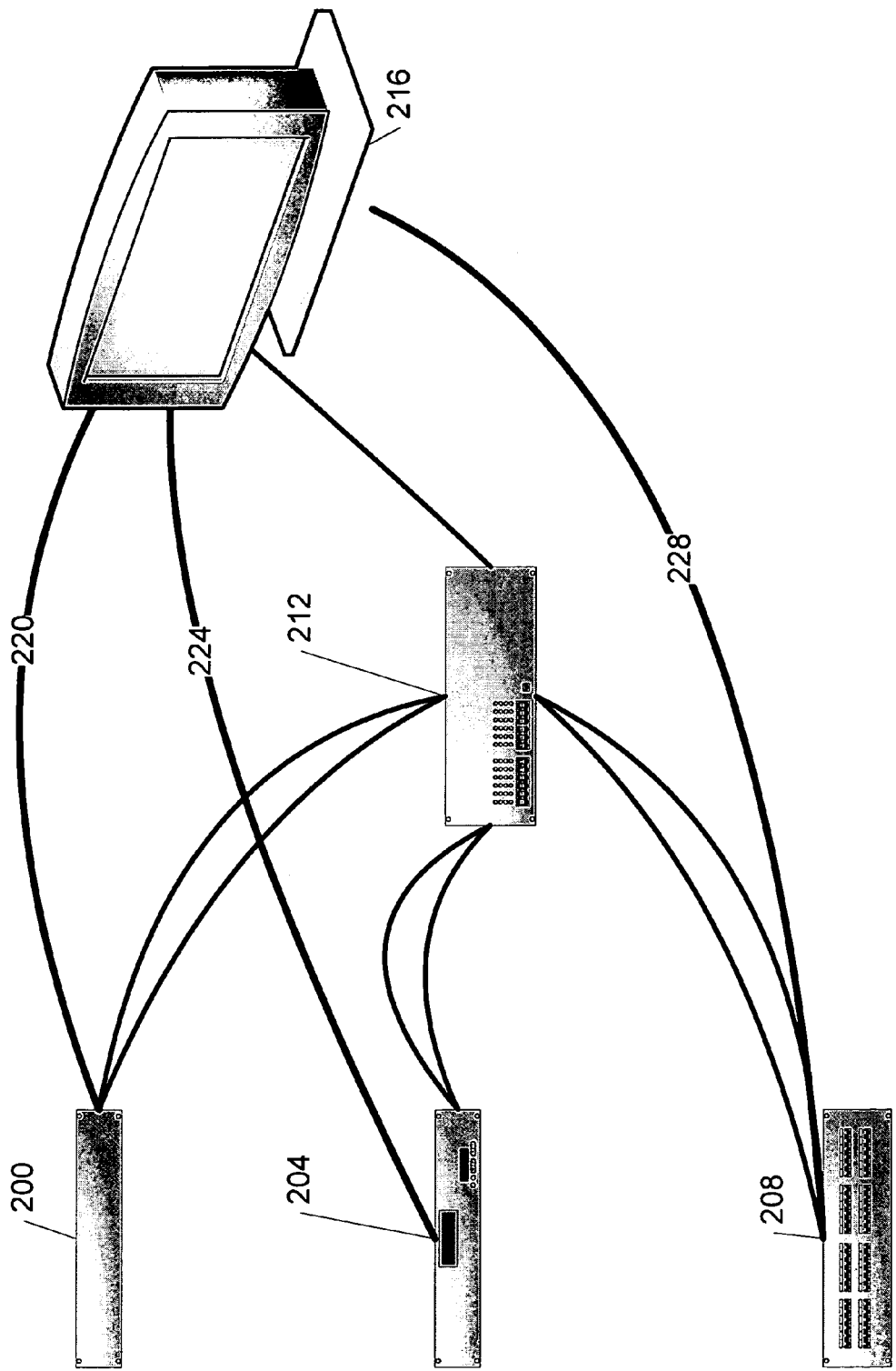
FIG. 2 illustrates a home theater system using the television as the video switching device.

FIG. 2, however, shows an increasingly common configuration as newer video technologies emerge. Audio connections from the set-top box 200, the DVD player 204, and DVD/CD changer 208 are made to the home theater receiver 212. The home theater receiver 212, however, lacks the type or quantity of video inputs required by the set of input devices. For instance, it may offer only composite or S-Video connections, while the input devices utilize high-definition component video, DVI, or HDMI connections. The video connections 220, 224, 228 are therefore made directly to the high-definition video monitor 216. Given the lack of integration between the home theater receiver and the monitor, however, the user will be required to individually command each device to switch to the desired input. Furthermore, due to variations in the numbers and types of inputs, it is likely that corresponding inputs on the receiver and monitor will have confusingly different names, like "VIDEO1" on the receiver and "COMPOSITE-2" on the monitor. The user must remember which inputs correspond to each other, or resort to trial and error until matching video and audio signals are located.

As described earlier, specialized remote controls exist to cope with these problems. They require, however, somewhat complex programming procedures and are generally quite costly.

The Present Invention

Figure 3:
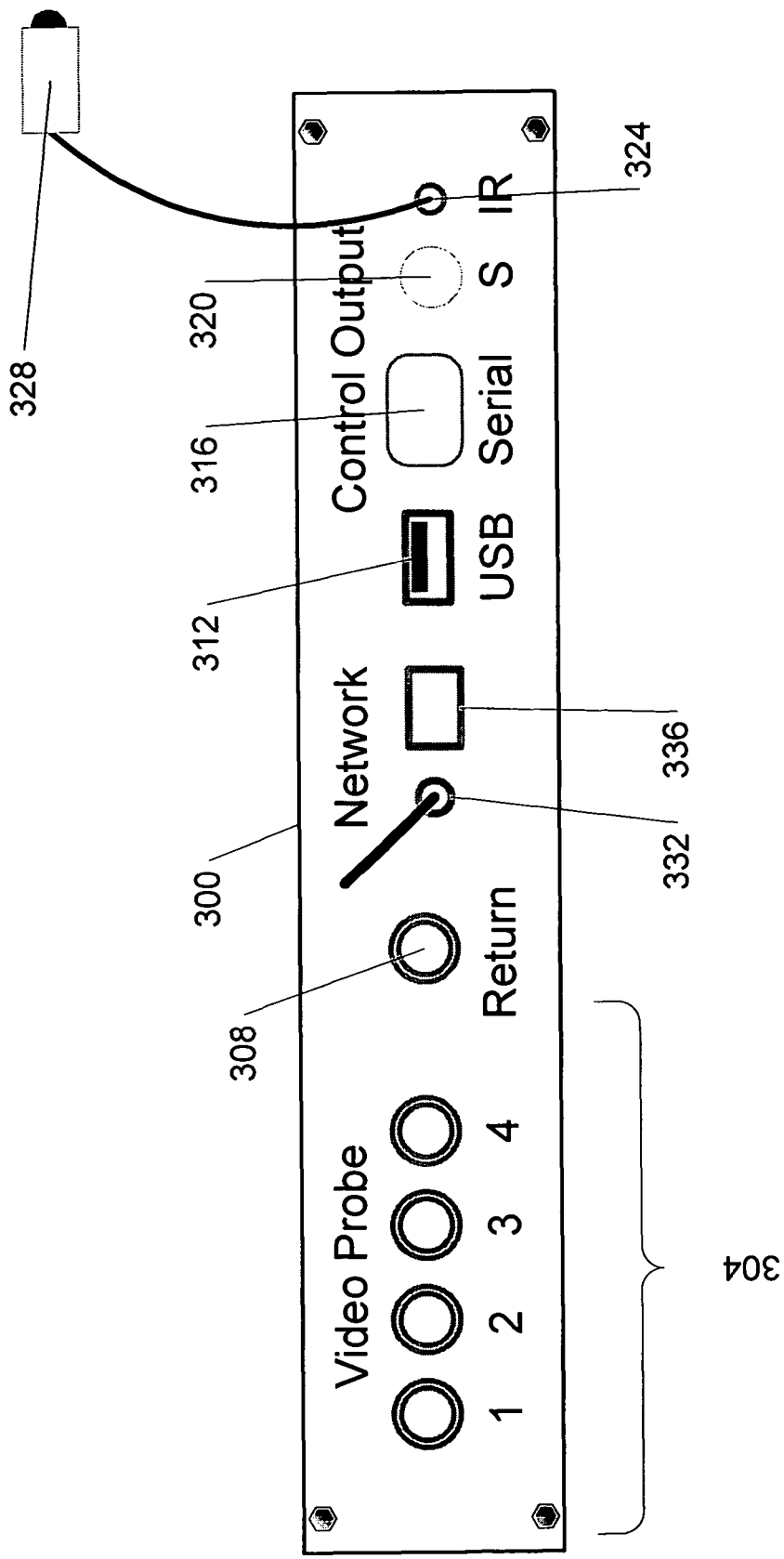
FIG. 3 illustrates the back panel of an embodiment of the present invention.

FIG. 3 shows the back panel of an embodiment of the present invention. In this embodiment the device 300 contains a set of video output ports 304, a video return port 308, an access port 312, a wired network port 336, a wireless network port 332 and a set of control output ports including a serial link 316, a proprietary vendor control link 320, and an infrared output 324. Some of these connections may not be present in some embodiments of the invention. Some connections may be replaced by other types of connections that serve similar purposes. For instance, the video output connections 304 and input connection 308 may be via composite video ports, S-video ports, component video ports, digital video connectors, or other video connectors. The network ports may be supplemented by or replaced with an RS-232, USB, IEEE 1394 or other type of connector.

Figure 4:
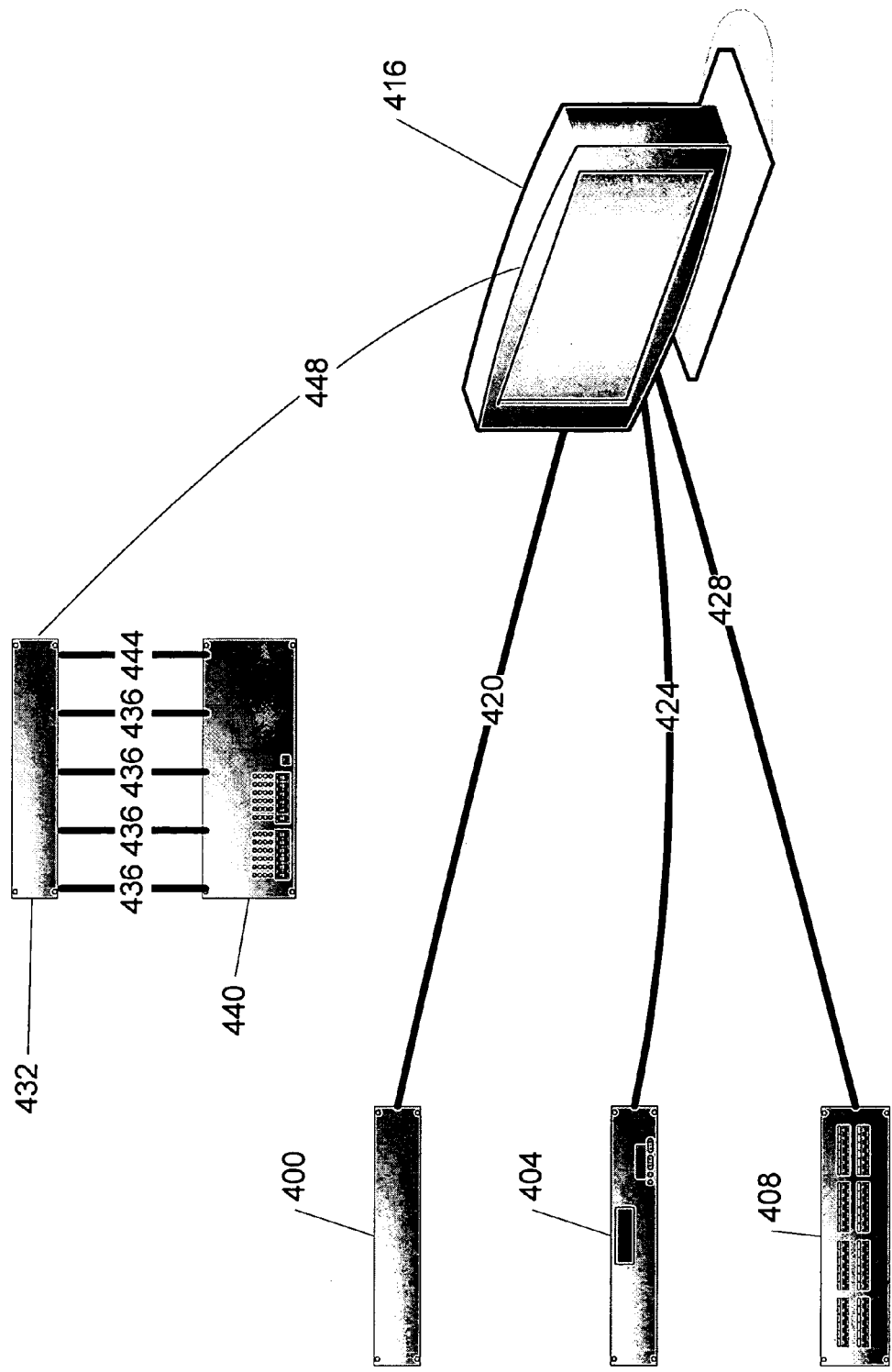
FIG. 4 illustrates a system using an embodiment of the present invention to allow the home theater receiver to passively control the video switching functionality of the television.

FIG. 4 shows an embodiment of the invention in use in a home theater system. As in FIG. 2, video connections of various types are made from devices like a set-top box 400, a DVD player 404, and a game system 408 to the video monitor 416. Audio connections have not been shown, but would be between each of the devices 400, 404, and 408, and the receiver 440.

An embodiment of the present invention 432 generates a plurality of distinguishable video "probe" signals and sends them over video connections 436. These probe signals could be actual video signals, pulses, voltages, sine waves, or any other signal that meets the criteria of being distinguishable from the other probe signals and being passed by the video switching equipment when selected.

The cables are connected at one end to the outputs of the device and at the other ends to the video inputs of the home theater receiver capable of switching video signals. Based on the video source selected at the receiver, one of the signals will be output on a video connection connected to the video output 444 of the receiver. The other end of the video connection is connected to the input of the device. The device detects which of the video signals is being returned by the receiver, thus determining the video path selected at the receiver. A lookup is performed to determine which commands need to be transmitted to set the video monitor to the corresponding video input.

For example, a DVD player may have its audio connected to a port labeled "VIDEO 2" on the home theater receiver 440 and its video connected to a port labeled "DVI" on the video monitor 416.

In another embodiment, the video device may be a television with an integrated tuner. When the appropriate selection is made using the home theater receiver remote, the audio from the television is selected and a selection signal is sent to the television to choose the tuner as the video source.

Figure 5:
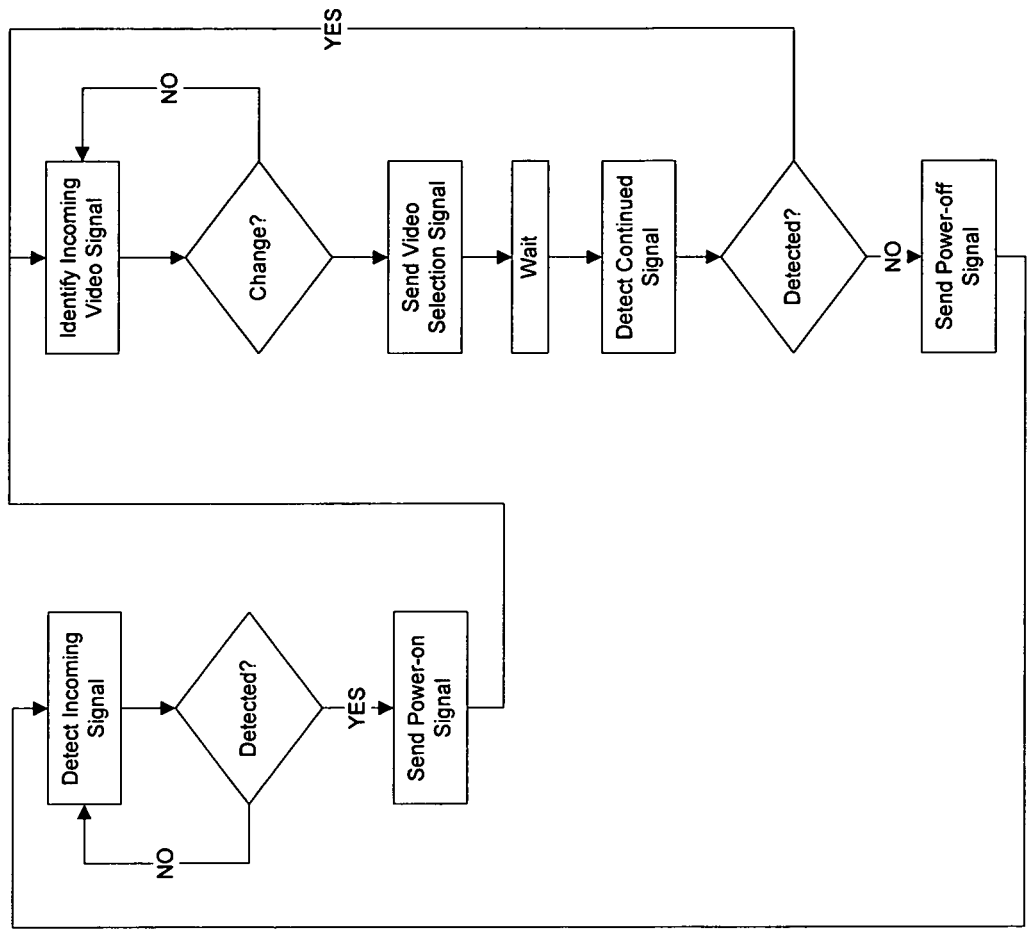
FIG. 5 illustrates a flowchart for the operation of an embodiment of the present invention.

FIG. 5 shows a flow chart which describes the logic for one embodiment of the invention.

Other Enhancements

In yet another embodiment, the device may include an infrared receiver used in the training of the device. Much like a learning remote, the device could detect infrared remote control outputs and store them for later replication. In a learning mode, the device could illuminate an LED corresponding to each channel prompting the user to perform the desired video-switching remote control sequence for that channel. Later, in operational mode, when the device detects that the video path is selected, it can playback the remote control sequence to switch the television to the appropriate video input.

The device may include flash or other non-volatile memory to allow settings to be stored through power failures. The device may also include an access port to allow programming from an external PC. In one embodiment, the device would have one or more network ports and an internal web server that allowed programming or setup via a web browser on another computer.

What is claimed is:

1. A method for coordinating the switching of video signals in a first video switching device and a second video switching device by a switching coordination device comprising the steps of:
   storing information regarding control signals for said second video switching device, said control signals operative to cause selection of one of a plurality of video inputs of said second video switching device, and information associating each of said control signals with one connection of a plurality of video output connections of said switching coordination device;
   generating, by said switching coordination device, a plurality of distinguishable video probe signals that do not represent video program content;
   transmitting said plurality of distinguishable video probe signals via said video output connections to said first video switching device, wherein each one of said plurality of distinguishable video probe signals is transmitted over one of said video output connections of said switching coordination device to one of a plurality of inputs of said first video switching device, said first video switching device operative to pass a signal from one of said inputs of said first video switching device to an output of said first video switching device;
   receiving a signal on a video input connection of said switching coordination device from said output of said first video switching device, said signal representing the one of said plurality of distinguishable video probe signals passed by said first video switching device;
   detecting which one of said distinguishable video probe signals was passed by said first video switching device in said signal received on said video input connection of said switching coordination device from said output of said first video switching device; and
   transmitting a control signal to said second video switching device, said transmitted control signal determined at least in part from said stored information regarding control signals for a second video switching device, said information associating each of said control signals with one connection of a plurality of outputs of said switching coordination device, and the result of said step of detecting which one of said distinguishable video probe signals generated by said switching coordination device was passed by said first video switching device in said signal received on said video input connection of said switching coordination device.

2. The method of claim 1 wherein said second video switching device does not switch audio.

3. The method of claim 1 wherein said first video switching device is a home theater receiver.

4. The method of claim 1 wherein said first video switching device is incapable of switching digital video signals.

5. The method of claim 1 wherein at least one of said video output connections of said switching coordination device is one of composite, S-video, or component.

6. The method of claim 1 wherein said second video connection is one of composite, S-video, or component.

7. The method of claim 1 wherein said second video switching device comprises a plurality of digital video inputs and at least one digital video output.

8. The method of claim 1 where said second control signal is one of a serial data connection, Control-L, LANC, Control-S, S-Link, Control-A1, Control-A1 II, or infrared.

9. A switching coordination device used to coordinate switching of a first video switching device and a second video switching device, comprising:
- at least one first signal generator for generating a plurality of distinguishable video probe signals that do not represent video program content;
- a plurality of video output connectors for transmitting said plurality of distinguishable video probe signals to a first video switching device, wherein each one of said plurality of distinguishable video probe signals is transmitted over one of said video output connectors of said switching coordination device to one of a plurality of inputs of said first video switching device, said first video switching device operative to pass a signal from one of said inputs of said first video switching device to an output of said first video switching device;
- a memory for storing information regarding control signals for said second video switching device, said control signals operative to cause selection of one of a plurality of video inputs of said second video switching device, and information associating each of said control signals with one connection of a plurality of video output connectors of said switching coordination device;
- at least one video input connector for receiving a signal from said first video switching device, said signal representing the one of said plurality of distinguishable video probe signals passed by said first video switching device;
- a processor for detecting which one of said distinguishable video probe signals was passed by said first video switching device in said signal received on said video input connector of said switching coordination device from said output of said first video switching device; and
- a signal generator for generating a control signal for said second video switching device, said transmitted control signal determined at least in part from said stored information regarding control signals for a second video switching device, said information associating each of said control signals with one connection of a plurality of outputs of said switching coordination device, and the result of said processor detecting which one of said distinguishable video probe signals generated by said switching coordination device was passed by said first video switching device in said signal received on said video input connector of said switching coordination device.

10. The device of claim 9 wherein said first video switching device is capable of switching a first set of types of video signals and said second video switching device is capable of switching a second set of types of video signals, wherein said second set of types of video signals contains at least one type of video signal not included in said first set of types of video signals.

11. A system for coordinated switching of audio and video signals, comprising:
- a first video switching device capable of switching video and audio signals and operative to pass a signal from one of a plurality of video inputs to a video output;
- a second video switching device comprising a plurality of video inputs; and
- a switching coordination device comprising:
  - a memory for storing information regarding control signals for said second video switching device, said control signals operative to cause selection of one of said plurality of video inputs of said second video switching device, and information associating each of said control signals with one connection of a plurality of video output connections of said switching coordination device;
  - at least one first signal generator for generating a plurality of distinguishable video probe signals that do not represent video program content;
  - a plurality of first connectors for transmitting said plurality of distinguishable video probe signals to a first video switching device, wherein each one of said plurality of distinguishable video probe signals is transmitted over one of said video output connections of said switching coordination device to one of a plurality of inputs of said first video switching device;
  - at least one video input connector for receiving a signal from said first video switching device, said signal representing the one of said plurality of distinguishable video probe signals passed by said first video switching device;
  - a processor for detecting which one of said distinguishable video probe signals was passed by said first video switching device in said signal received on said video input connector of said switching coordination device from said output of said first video switching device; and
  - a signal generator for generating a control signal for said second video switching device determined at least in part from said stored information regarding control signals for a second video switching device, said information associating each of said control signals with one connection of a plurality of outputs of said switching coordination device, and the result of said processor detecting which one of said distinguishable video probe signals was passed by said first video switching device in said signal received on said second video connector;
- wherein said first video switching device is capable of switching a first set of types of video signals and said second video switching device is capable of switching a second set of types of video signals, wherein said second set of types of video signals contains at least one type of video signal not included in said first set of types of video signals.

12. The system of claim 11 wherein said second video switching device further comprises a digital video output.

* * * * *